Patented Apr. 30, 1940

2,199,077

UNITED STATES PATENT OFFICE 2,199,077

REFRIGERATION

Alvar Lenning, Stockholm, Sweden, assignor, by mesne assignments, to Servel, Inc., Dover, Del., a corporation of Delaware Application November 1, 1932, Serial No. 640,583

51 Claims. (Cl. 62—119.5)

This application is a continuation in part of my copending application, Serial No. 506,591, filed Jan. 5, 1931.

My invention relates generally to refrigeration; more specifically to refrigeration systems of the absorption type; and still more particularly to systems employing a pressure compensating fluid.

Among the objects of my invention are: to provide an operable refrigerating system utilizing a plurality of refrigerants; to provide apparatus for and method of separating complementary refrigerants; to provide a novel system in which pressures are balanced by liquid column; to provide novel absorption apparatus; to provide efficient liquid circulation in a system operable without moving parts; to provide a system in which pressure compensating fluid is forced through liquid, and more particularly absorption liquid; to provide novel features of apparatus and method in heat exchange and gas and liquid contact; to provide a system in which a pressure rise in circulating fluid is utilized to promote circulation; to provide a system in which circulation of both absorption liquid and pressure equalizing fluid is produced by a single factor, more particularly pressure in a local circuit between an evaporator and an absorber, and still more particularly by liquid column; to provide an absorber having the function of a boiler; to take care of excess fluid not in transit in a refrigeration system; to provide for maintenance of temperature differential for separation of fluids, more particularly of an absorber; to provide a no-moving-part refrigeration system particularly adapted to operate at relatively high evaporator temperature; to provide an efficient propane-ammonia system; to provide a system having an absorber heated at an upper part and cooled at a lower part for condensation and reevaporation of a refrigerant; to provide novel means for applying heat to an absorber in which a refrigerant has condensed; and others as will hereinafter appear.

Reference may be had to the accompanying drawings forming part of this specification, and of which.

Figure 1:
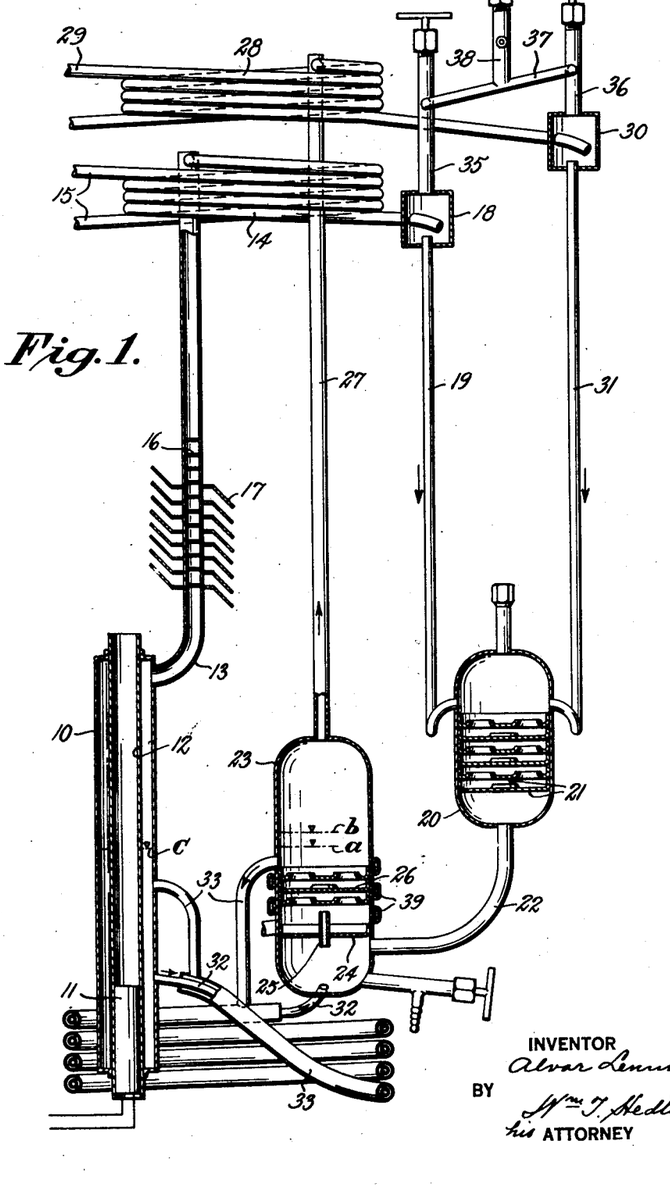
Fig. 1 is a vertical elevational view, partly in section, showing one form of refrigeration system embodying the invention in which vapor passing from the evaporator to the absorber causes circulation between the generator and the absorber.

The apparatus shown in Fig. 1 comprises a generator 10, which may be heated in any desired way, as by an electric heater 11 inserted in the flue 12 extending through the generator. The generator is a vertically disposed cylindrical vessel. Connected to the upper part of the generator is a conduit 13, the upper end of which is connected to a condenser 14. Condenser 14 is cooled by water flowing through the tube 15. It will be understood that other cooling means may be employed. The condenser tube and the water tube 15 are side by side and wound into a coil. In conduit 13 are some baffles 16, and flanges 17 are secured outside this conduit. Baffles 16 and flanges 17 constitute a rectifier. Any form of rectifier may be used, and while the rectifier shown is air-cooled, it may equally well be water cooled.

Condenser 14 is connected to a chamber 18, the condenser pipe projecting thereinto. A conduit 19 is connected to chamber 18 and extends vertically downward and is connected to an evaporator 20, which is a hollow cylindrical vessel with rounded ends and which contains distributing discs or baffles 21 having apertures therein. The apertures are surrounded by raised rims and those in adjacent plates are out of vertical alignment.

A conduit 22 is connected to the bottom of the evaporator and to an absorber 23, which is also a cylindrical vessel with rounded ends. A transverse plate 24 it situated within the absorber above the connection of conduit 22 thereto, and this plate has a single centrally disposed aperture therethrough formed by a tube 25. Above plate 24 and tube 25 is a number of baffles 26 similar to the baffles in the evaporator. The apertures in baffles 26 are also out of vertical alignment.

A conduit 27 extends vertically up from the top of the absorber and its upper end is connected to a second condenser 28 similar to condenser 14. Condenser 28 is cooled by a water pipe 29. Condenser 28 is connected at its other end to a chamber 30, the condenser tube projecting thereinto. A conduit 31 extends downwardly from chamber 50

30 and, like conduit 19, is connected to the evaporator above baffles 21.

A conduit 32 connects a low point of generator 10 with the bottom of the absorber. Conduit 32 extends, for part of its length, within a conduit 33. Conduit 33 connects a point in the absorber above baffles 26 with a point in generator 10 above the connection of conduit 32 thereto. Where these conduits pass within each other they form a liquid heat exchanger.

Connected at the tops of chambers 18 and 30 are pipes 35 and 36. A cross-connection 37 is connected between pipes 35 and 36. A charging valve 38 is connected to cross-connection 37. Valves are provided in pipes 35 and 36 to permit shutting off communication between the same and cross-connection 37. Other valves may be provided for charging or discharging or testing the apparatus such as the valve shown at the bottom of the absorber.

A coil 39 surrounds the absorber. Cooling water may pass through this coil, but when using the substances hereinafter specifically referred to with which I have operated this apparatus, it is possible to operate the apparatus without passing any cooling water through this coil. Whether the absorber is cooled by an external medium or not, the heat liberated by the absorption of the ammonia must be removed. This can, in case of such non-cooling of the absorber by an external medium, be effected by means of an evaporation process in the absorber, as will be further described below.

Gage glasses may be applied to the various vessels and pipes to determine heights of liquid, and a pressure gage may be connected to the top of the evaporator or other suitable place.

The apparatus is charged with ammonia as a primary refrigerating agent, propane as an auxiliary refrigerating agent and pressure compensating or equalizing fluid, and distilled water as an absorption liquid. The apparatus should be charged so that, in operation, the liquid level in the generator is above the point of connection of conduit 33 therewith, for example, at c, and so that the liquid level in the absorber is above the point of communication of conduit 33 therewith, for example, at a, and so that there is liquid in the pipes 19 and 31. Allowance should be made for some liquid in each of the condensers.

In the apparatus shown in the drawings which I have built and operated, the height of the absorber (outside dimension) is 10 inches. From this the dimensions of the rest of the apparatus can be determined since all the parts are of circular cross-section and the drawings are made to scale. In this apparatus, when operating it, I have charged it with 1,700 cubic centimeters of ammonia solution of a specific gravity of .92 and about 100 cubic centimeters of liquid propane. It will be understood that the amount of fluid will vary for different sizes and shapes of apparatus and that these figures are merely illustrative. Enough propane should be supplied to fill the condenser 28, chamber 30 and pipe 31. A slight excess may be placed in the apparatus without harming the operation since any excess not in transit will collect in the absorber as, for example, the amount represented by the space between lines a and b.

The operation of this apparatus when charged as described is as follows:

Heat applied to the generator causes ammonia vapor to be expelled from solution. The ammonia vapor passes upwardly in the generator and through conduit 13 to condenser 14. The entrainment of water vapor with the expelled ammonia vapor is unavoidable and the rectifier is provided to remove this water vapor. The ammonia vapor passes into condenser 14 which is cooled by the cooling water flowing through pipe 15. This condenses the ammonia vapor and the liquid ammonia flows into chamber 18 and pipe 19.

At the same time, propane vapor passes upwardly through conduit 27 from the absorber and is condensed in condenser 28. The liquefied propane flows into chamber 30 and conduit 31. Liquid columns of ammonia and propane, respectively, are built up in conduits 19 and 31 in the normal operation of the apparatus. Liquid ammonia and liquid propane enter the evaporator from conduits 19 and 31 and both these fluids evaporate, forming a gaseous mixture of propane vapor and ammonia vapor. This gaseous mixture flows downwardly through the evaporator and through conduit 22 into the absorber. The part of the absorber below plate 24 contains liquid. The gas flowing through conduit 22 passes upwardly through tube 25 and entrains absorption liquid therewith, moving the absorption liquid into the upper part of the absorber. In order to force gas through the tube 25 there must be a higher pressure in the evaporator than in the upper part of the absorber by an amount measured by the height of liquid or hydrostatic pressure in the absorber above the point of connection of conduit 22 thereto and the resistance to flow in the absorber. This higher pressure is maintained in the evaporator by the liquid columns in conduits 19 and 31, and it is the head or hydrostatic pressure of these columns which forces the gas through the tube 25 and which thereby causes circulation of the absorption liquid. The columns are formed in order to create this pressure. They need not be artificially formed but form of themselves when heating and cooling are applied to the apparatus.

The liquid entering the absorber from the generator through pipe 32 is lean absorbent, weak in ammonia, and therefore the ammonia in the gaseous mixture is absorbed by this liquid. In the absorber, the propane becomes separated from the ammonia and passes upwardly through conduit 27. The enriched ammonia solution flows through conduit 33 to the generator, where the ammonia is driven off. Weak absorption liquid passes through conduit 32 to the absorber. The pressure created in the evaporator by the liquid columns causes the gas mixture resulting from the complementary diffusion of the ammonia and propane in the evaporator to flow through pipe 22 and flow into liquid in the absorber and causes movement of the absorption liquid upwardly in the absorber and downwardly in the generator. It will be noted that the connection of pipe 22 with the absorber is well below the surface level of liquid in the absorber. The gas entering the absorber bubbles through liquid in the absorber and with the aid of the narrow tube 25 the bubbling gas raises the absorption liquid to a level such that the absorption liquid after enrichment can flow by gravity to the generator through pipe 33. Intimate contact and good absorption are obtained due to the bubbling of the gas within the liquid body.

Any propane not in transit will collect as liquid on the surface of the ammonia solution in the absorber. Due to the heat liberated by the absorption of the ammonia, such propane can be brought to again evaporate and thus remove heat from the absorber which is not taken away therefrom by its external cooling.

Such heat removed from the absorber by evaporation of propane liquid collecting on the surface of the ammonia solution in the absorber is transferred to the propane condenser and there given off to its cooling medium. The apparatus can also be operated by applying heat externally to the absorber. Such heating may be applied when starting the unit the first time in order to quickly bring about the proper distribution of fluid within the system.

Evaporation of liquid ammonia and liquid propane in the evaporator produce refrigeration. The operation of this embodiment is continuous, the flow through the various conduits being in one direction continuously.

This system differs from systems using hydrogen as a pressure equalizing medium in that the propane, which may be considered as replacing hydrogen as the inert gas into which the refrigerant evaporates, not alone provides the gaseous atmosphere into which ammonia evaporates, but also evaporates itself. Propane, acting as the auxiliary medium is partly gaseous and partly liquid in its circuit. In its gaseous state it is a dense gas relative to, for example, hydrogen, propane ($C_3H_8$) having a molecular weight of 44 compared to a molecular weight of 2 for hydrogen. The molecular weight of ammonia ($NH_3$) is 17. Air, sometimes suggested as an inert gas for an ammonia diffusion system, is chiefly made up of oxygen having a molecular weight of 32 and nitrogen having a molecular weight of 28. This propane in its gaseous form is heavier or denser than ammonia or air. Propane, like air and hydrogen, is inert with respect to ammonia.

It makes no difference where the fluids are charged into the apparatus, and the propane and ammonia solution may be charged into the same part of the apparatus.

It will be seen that the gas which is used for producing the liquid circulation is cold gas and the production of this gas does not involve any application of heat at a temperature higher than the temperature at which the heat is taken up by the evaporator.

The quantity charged into the apparatus may vary considerably since the level in the generator need not be fixed, nor need the level in the absorber be fixed. It is sufficient that the levels be somewhere between the communication of conduit 33 and the upper part of the respective vessels.

In order that the propane may pass to the propane condenser and condense, the absorber should not be cooled to too great an extent and it need not be cooled at all. Heat is exchanged between the liquid flowing into the generator and the liquid flowing out of the generator. This provides a saving in the amount of heat applied. Conduit 37 equalizes the total pressure in the condensers.

Figure 2:
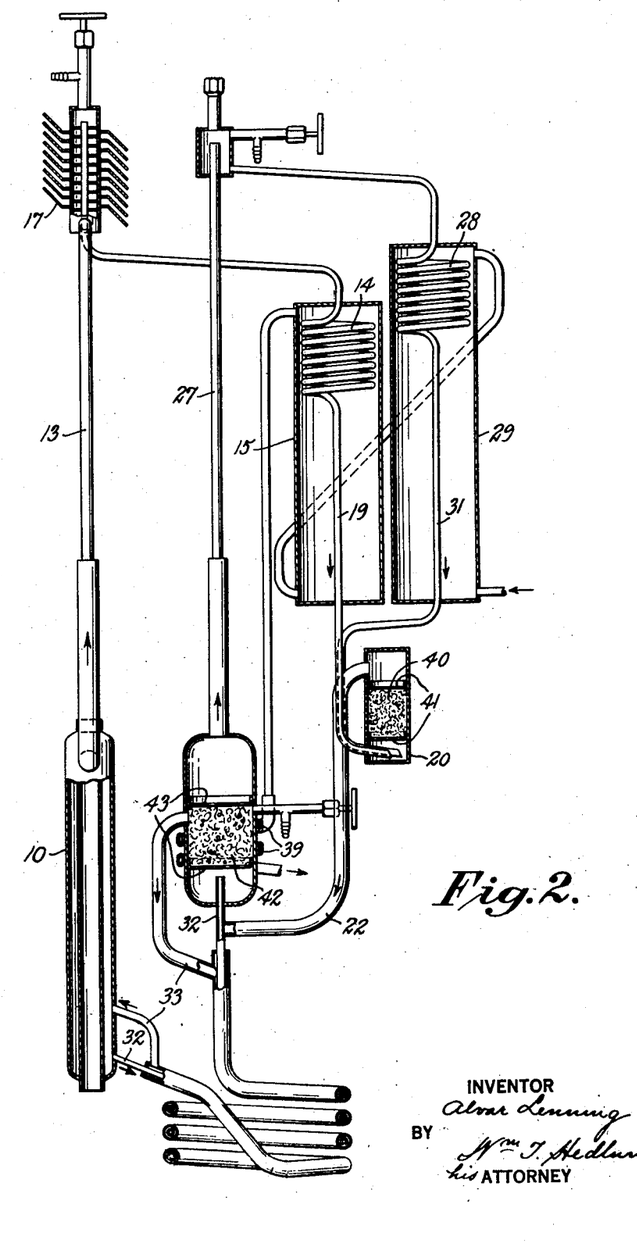
Fig. 2 is a similar view of another embodiment of the invention having a so-called flooded evaporator.

Another form of apparatus embodying the invention is shown in Fig. 2. Like reference characters are used to designate corresponding parts. One example of the fluids which I have used in this apparatus is 2,300 cubic centimeters of ammonia solution of a specific gravity of .905 or 26 per cent concentration and 3 ounces of propane. The operation of this apparatus is essentially the same as that of Fig. 1. The condensers 14 and 28 are contained in separate tanks 15 and 29, but they may be contained in the same tank.

Cooling water is supplied to tank 29 and then to tank 15 and then to the coil 39 around the absorber. As above stated in connection with Fig. 1, the cooling of the absorber may be omitted.

The pipes 19 and 31 are connected into the bottom of the evaporator instead of the top thereof. The pipe 22 is connected to the top of the evaporator instead of the bottom thereof. It will be seen that the apparatus of Fig. 2 has a flooded type of evaporator containing a pool or body of liquid refrigerant therein as distinguished from the dry type of evaporator of Fig. 1, it being understood, however, that liquid is held on the discs 21 of the evaporator of Fig. 1.

In the apparatus of Fig. 2 I have provided metal wool 40 in the evaporator between perforated plates 41 therein. Metal wool 42 is also used in the absorber between perforated plates 43 therein. The conduit 22 is connected to the conduit 32. The introduction of the gas mixture into conduit 32 serves to lift liquid upwardly in the absorber and cause circulation in the same manner as that described in connection with Fig. 1. Liquid columns are formed in the pipes 19 and 31, a liquid column of ammonia being formed in pipe 19 and of propane being formed in pipe 31. The head of these columns produces the excess pressure in the evaporator which forces the gaseous mixture of propane and ammonia vapor through conduit 22 and into conduit 32. This produces circulation upwardly in the absorber and downwardly in the generator.

A pool of liquid refrigerant is maintained in both the pressure equalizing fluid circuit, namely in evaporator 20, and in the absorbent circuit, namely in the absorber. The excess pressure in the evaporator caused by the hydrostatic heads of liquid in pipes 19 and 31 and reacting against the hydrostatic pressure of the liquid column in the absorber causes refrigerant to flow from the evaporator and into the pool of liquid in the absorber and thence in solution to the generator, and causes the absorbent to flow upwardly in the absorber to such an elevation that it can flow by gravity through pipe 33 to the generator and thence back to the absorber through pipe 32. This drawing is likewise to scale. The height of the absorber in the cooling apparatus is 9 inches, from which the dimensions of the other parts can be scaled off.

Each of the apparatuses described is hermetically sealed and no force is transmitted through the metal of the apparatus. Circulation may be said to be produced by forces generated within the system.

Figure 3:
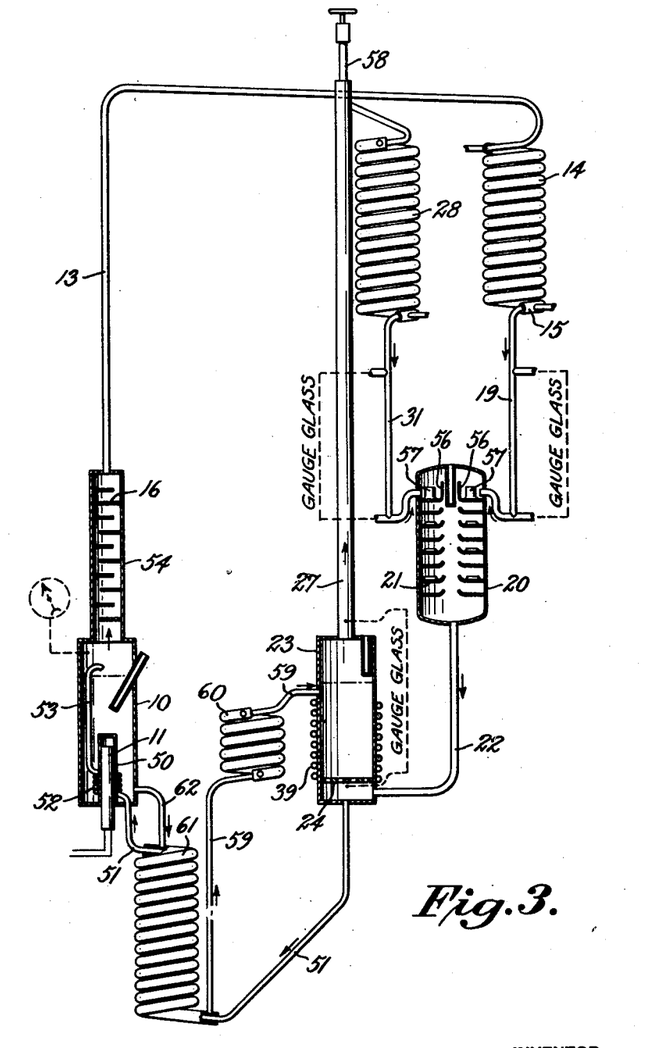
Fig. 3 is a similar view of another embodiment of my invention in which circulation between generator and absorber is produced by a thermosyphon.

Still another apparatus is shown in Fig. 3. Again, like reference characters designate like parts. This apparatus also may be charged with ammonia, propane and water, although the invention is not limited to the use of these fluids. The generator 10 comprises a hollow steel shell provided at its bottom end with an inverted cup 50, which is welded or otherwise secured to an opening therein and which is adapted to receive an electric cartridge heating element 11. Obviously, a gas flame or other heating means may be employed in place of the electric heater.

In normal operation, a solution of ammonia circulates through the generator. For conducting the solution into the generator a pipe 51 extends through the lower end of the generator proper and is connected to a small coil of tubing 52, which is wrapped around the inverted cup 50. The upper end of the coil 52 is connected to a vertically extending pipe 53, which may be reversely bent at its upper end as shown. By this means when the current passes through the electric heater 11, bubbles of ammonia gas are generated in the coil 52, and as they rise through the pipe 53 lift the solution into the generator 10.

Ammonia vapor passes upwardly to pipe 13 through a rectifier 54, which contains discs or baffles 16 for removing water vapor which is driven off with the ammonia. The pipe 13 is connected to the ammonia condenser 14. As ammonia is driven off from solution in the generator, the weak solution is conducted away through the conduit 62.

The condensers 14 and 28 may also in this case be of any suitable construction. For purposes of illustration, they are shown as consisting of a small pipe coil inside of a larger one 15, through which latter coil the water is adapted to circulate. The size of the condenser tubing in an apparatus built and operated by me in accordance with this embodiment is approximately ⅝ of an inch outside diameter with slightly less internal diameter. The condensers should be located a considerable distance above the evaporator so that fluid columns may be formed in the pipes 19 and 31.

The evaporator, like the other parts, is made of steel and is cylindrical and contains lateral sets of discs 21. The upper discs are formed with upstanding rims 56 and 57 to provide relatively deep cups for receiving liquid ammonia and propane from the conduits 19 and 31. The flanges 57 are circular and provide overflow for the respective liquids onto the lower discs. The fluids evaporate from the respective discs in the evaporator and the evaporated mixture flows out from the evaporator through conduit 22. The evaporation in the evaporator abstracts heat from the surroundings, thus producing refrigeration. Any liquid which may have been supplied to the evaporator and not vaporized, drains through the conduit 22.

The absorber or separating vessel 23 consists of a cylindrical drum closed at the ends. It may be cooled by circulating water through the coil 39 secured to the absorber shell. A perforated baffle plate 24 is situated near the lower end immediately above the point where the pipe 22 is connected to the absorber. The upper end of the absorber is connected to the upper end of condenser 28 by means of pipe 27, this pipe being of larger diameter than that of the inner conduit of the condenser.

The apparatus may be provided with any suitable charging devices, a valve 58 being shown for this purpose at the top of conduit 27.

For supplying absorption liquid to the absorber, a conduit 59 is connected to the absorber as shown. A regulating coil 60 may be placed around a part of conduit 29 through which water of predetermined temperature may be circulated, but this coil is not necessary to operation of the apparatus. The lower end of conduit 59 is connected to an outer jacket 61 of a heat exchanger, the jacket 61 surrounding the conduit 51. The upper end of the jacket 61 is connected to conduit 62.

For conducting the absorption solution away from the absorber, the pipe 51, which is connected to the coil 52 of the boiler 10 and which forms the central pipe of the liquid heat exchanger, is connected into the lower end of the absorber.

There are three cycles for fluid circulation provided by this construction. One cycle, which may be termed the ammonia cycle or main circuit, takes place from the generator 10 through the rectifier 54, pipe 13, condenser 14, evaporator 20, absorber 23, conduit 51, thermosiphon coil 52, and pipe 53, back to the generator. Another cycle, which may be called the propane cycle or propane local circuit, takes place from the absorber 23 through the pipe 27, condenser 28, pipe 31, evaporator 20 and pipe 22, back to the absorber. The third cycle, which may be called the solution cycle, takes place between the generator and the absorber, the circuit being from the generator through conduit 62, the outer coil 61 of the liquid heat exchanger, conduit 59, the absorber 23, and back to the generator through the conduit 51, coil 52, and pipe 53.

The operation of this apparatus will be clear from the above description and the description of operation given in connection with the previous embodiments. It will be noted particularly in this embodiment that the liquid flowing between the absorber and the generator is caused to circulate by means of a thermosiphon coil, wherefore the circulation is downwardly in the absorber, instead of upwardly as in the previous embodiments. The liquid level in the generator is maintained approximately at the top of the riser pipe 53 and preferably somewhat below the top of this pipe. The liquid level in the absorber is somewhat lower and it may be slightly above the connection of conduit 59 thereto. Liquid flows by gravity from the generator through conduit 62, jacket 61, and pipe 59. The thermosiphon coil draws liquid from the absorber through pipe 51 and lifts it to the upper part of the generator.

Ammonia vapor passes upwardly from the generator and entrained water vapor is removed in the rectifier, the ammonia vapor passing through conduit 13 to the ammonia condenser 14, where it is condensed due to the cooling water flowing in the jacket of this condenser. The liquid ammonia passes into the liquid column pipe 19 and thus finds its way to the evaporator. Propane vapor leaves the upper part of the absorber and passes through conduit 27 into the propane condenser 28. The propane flows downwardly through pipe 31 and into the evaporator. The propane and ammonia evaporate in the evaporator and flow through conduit 22 into the absorber. The propane in part liquefies in the absorber and there is a pool of propane on the ammonia solution in the absorber. The apparatus may be operated without any cooling of the absorber, as described in connection with the other embodiments. It is necessary to maintain at least the upper portion of the absorber at a temperature higher than that of the condenser 28. This difference of temperature need only be sufficient to insure vaporization of propane in the absorber and condensation in the condenser. Cooling water may be circulated through the coil 39 though, as before stated, I have found that this is not necessary when operating at ordinary room temperature, in such case the temperature of the air, relative to the cooling water, being sufficient to maintain the necessary temperature difference.

Since it is impossible to entirely separate fluids, there will be some ammonia gas in the propane condenser and some propane gas in the ammonia condenser. These gases are readily carried out by the fluids in these pipes and I have found that the operation of the apparatus is not impaired on account of this condition.

In the apparatus operated by me from which Fig. 3 is reproduced, the external height of the absorber is 12 inches. The drawing is to scale, wherefore the dimensions of the various parts can be readily computed.

I have charged this apparatus with 4,300 cubic centimeters of ammonia solution of a specific gravity of .92 and 9 ounces of propane.

Obviously, the charging of the apparatus is merely a question of volumetric calculation. The apparatus may be purged of air by application of heat or by vacuum.

Figure 4:
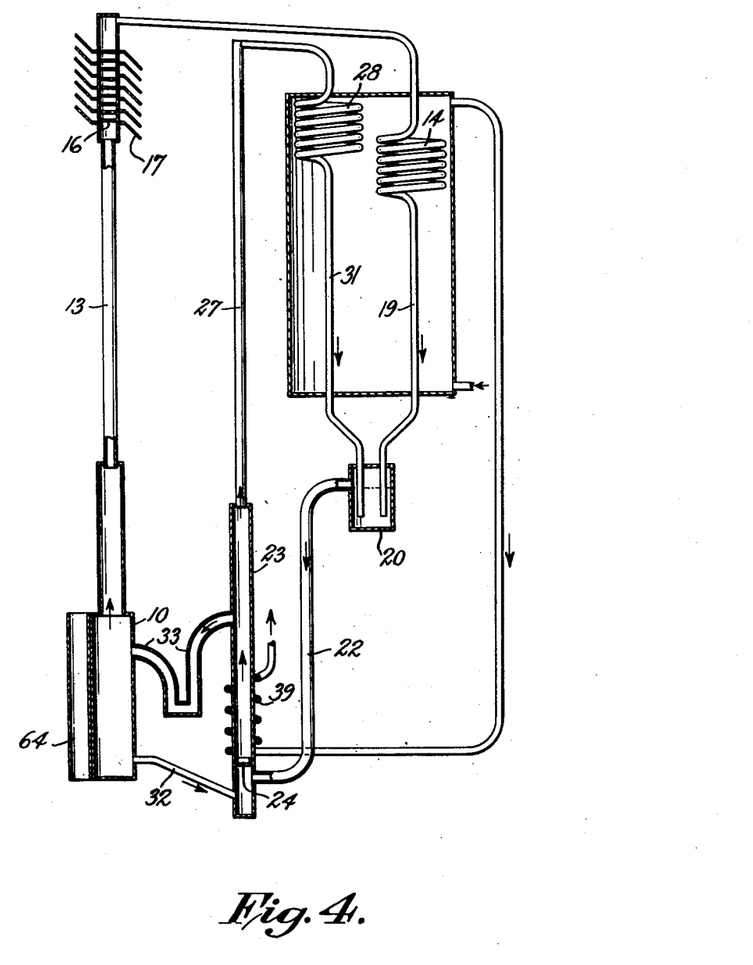
Fig. 4 is a similar view of still another embodiment of my invention employing an intermittent circulation between generator and absorber.

In Fig. 4 I have shown still another form of apparatus which I have operated. Again, in this case like reference characters designate like parts. In this apparatus, as built, the height from the bottom of the generator to the top of the rectifier is 40¾ inches. The drawing is to scale, wherefore the dimensions of the parts can be readily determined. In this case the heat exchanger between the generator and the absorber is omitted and the pipe 33 is bent in the form of a trap to prevent passage of gas. The general direction of circulation is the same as in Figs. 1 and 2, namely, upwardly in the absorber, and downwardly in the generator. I provide a tube 64 attached to the side of the generator into which an electric heater may be inserted for heating the same. The pipe 32 is restricted in order to control the circulation. The rate of circulation can obviously be controlled by dimensioning the size of the pipe or by placing a valve in the pipe and adjusting the valve until the rate is satisfactory. In this case I have made the pipe 32 of $\frac{1}{16}$ of an inch outside diameter, #17 gage.

In operation of this apparatus I have found that the circulation sometimes reverses itself between the generator and the absorber. This reversal can assist in evaporating propane from the surface of the ammonia solution in the absorber, due to the warm solution passing through the pipe 33. Thus the pipe 33 constitutes a means for heating the upper part of the absorber for vaporizing the propane therein. The ammonia condenser is placed lower than the propane condenser on account of the difference in specific weight of propane and ammonia. It is desirable to so arrange the heights of the ammonia and propane condensers above the evaporator that the liquid columns will extend somewhat into the condensers. The liquid level in the evaporator stands at the level of pipe 22 and there may be an overflow of liquid from the evaporator through the conduit 22.

With this apparatus it is possible to vaporize the liquid propane from the top of the absorber intermittently, the solution flowing first in one direction and then the other.

I have operated this apparatus with 775 cubic centimeters ammonia solution of .93 specific gravity and 25 grams of propane.

It will be obvious that cabinets for cooling materials may be disposed around the evaporators of the various refrigerating apparatuses. Also, it will be understood that the data with respect to any of the embodiments is applicable to the other embodiments.

What I claim is:

1. Refrigerating apparatus adapted to produce cooling effect by the evaporation of ammonia and propane including an evaporator in which said ammonia and propane may simultaneously evaporate, an absorber in which the ammonia may be absorbed by an absorption liquid, means for cooling the lower portion of the absorber, and means for heating the upper portion of the absorber to vaporize liquid propane therein.

2. Refrigerating apparatus adapted to produce cooling effect by the evaporation of a main refrigerant and an auxiliary refrigerant, said apparatus including an evaporator in which said refrigerants may evaporate, an absorber in which the main refrigerant is absorbed by an absorption liquid, a generator for expelling the main refrigerant from the absorption liquid, a condenser for said main refrigerant connected between said generator and said evaporator, a condenser for said auxiliary refrigerant connected between said absorber and said evaporator and means for causing the auxiliary agent to pass through a cycle in which it is vaporized in the evaporator, liquefied in the lower portion of the absorber, again vaporized in the upper portion of the absorber, again liquefied in the condenser and returned to the evaporator.

3. Refrigerating apparatus adapted to produce a cooling effect by the evaporation of a main refrigerant and an auxiliary refrigerant, said apparatus including an evaporator in which said refrigerants may evaporate, an absorber in which the main refrigerant is absorbed by an absorption liquid, a generator for expelling the main refrigerant from the absorption liquid, a condenser for said main refrigerant connected between said generator and said evaporator, a condenser for said auxiliary refrigerant connected between said absorber and said evaporator and means for causing the auxiliary agent to pass through a cycle in which it is vaporized in the evaporator, liquefied in the lower portion of the absorber, again vaporized in the upper portion of the absorber, again liquefied in the condenser and returned to the evaporator, said means including a device for cooling fluids in the lower portion of the absorber and a device for heating fluids in the upper portion of the absorber.

4. In an absorption refrigerating system employing two refrigerants, an absorber, means for conducting a gaseous mixture of the refrigerants into said absorber, means for conducting a solvent for one of said refrigerants into said absorber and means for heating one portion and cooling another portion of said absorber.

5. In an absorption refrigerating system employing two refrigerants, an absorber, means for conducting a gaseous mixture of the refrigerants into said absorber, means for conducting a solvent for one of said refrigerants into said absorber and means for maintaining the upper portion of said absorber at a higher temperature than the lower portion thereof.

6. In absorption refrigerating apparatus adapted to employ a main refrigerant and an auxiliary pressure equalizing agent, the combination with an absorber, a condenser, an evaporator and conduits connecting the same, of means for circulating said auxiliary agent between said absorber, condenser and evaporator, said means including a device for cooling the lower portion of the absorber, a device for heating the upper portion of the absorber and a device for cooling said condenser whereby said auxiliary agent will be caused to condense in said absorber and evaporate therefrom and again condense in said condenser.

7. In refrigerating apparatus employing a main refrigerant and an auxiliary pressure equalizing agent and having an evaporator and an absorber, the method of circulating the auxiliary pressure equalizing agent between the absorber and the evaporator which consists in vaporizing the agent in the evaporator, liquefying the same in the absorber, applying heat to a portion of the absorber to vaporize the auxiliary agent and condensing the auxiliary agent at a level above the evaporator whereby it may flow back into the evaporator by gravity.

8. In an absorption refrigerating system employing two refrigerants, the combination of an evaporator wherein both of said refrigerants may evaporate, a separating vessel, a conduit for conveying the vaporized refrigerants from said evaporator to said separating vessel, a generator, means for circulating an absorption solution between said generator and said separating vessel to convey one of said refrigerants to said generator, means for cooling a portion of said separating vessel to cause the other of said refrigerants to condense therein and form a layer on top of the absorption solution therein, means for heating said generator and a portion of said separating vessel to vaporize the refrigerants and means for condensing said refrigerants and returning them to said evaporator.

9. In a refrigerating system of the absorption type employing two refrigerants, means for causing one of said refrigerants to pass through a cycle in which it is separated from an absorption solution by the application of heat, condensed, evaporated to produce a cooling effect and returned to the absorption solution and means for causing the other of said refrigerants to pass through a cycle in which it is vaporized from a liquid phase by the application of heat, condensed and evaporated with the first mentioned refrigerant for the production of cooling effect and again changed to a liquid phase.

10. In a refrigerating system employing a plurality of refrigerants, a vessel for separating said refrigerants after they have become mixed and means for heating a portion of said vessel to vaporize one of said refrigerants.

11. In an absorption refrigerating system employing a plurality of refrigerants, a vessel for separating said refrigerants and means for heating a portion of said vessel to vaporize one of said refrigerants, said means consisting of a conduit adapted to convey an absorption solution to a portion of said vessel.

12. The method of producing refrigeration including the steps of feeding a plurality of refrigerants in liquid phase into an evaporator, conducting the vaporized refrigerants from the evaporator into a separating vessel, changing the refrigerants to more dense fluid phase in said vessel and separating the same by gravity.

13. The method of producing refrigeration including the steps of feeding two different refrigerants in liquid phases into an evaporator, conducting the vaporized refrigerants from the evaporator into a separating vessel, changing the refrigerants to more dense fluid phase in said vessel, separating the same by gravity, vaporizing each refrigerant after it has been separated from the other, condensing said refrigerants separately and again feeding them into the evaporator.

14. A refrigerating system including two refrigerants, a solution adapted to absorb one of said refrigerants but not the other and having a different specific gravity than the refrigerant not absorbed, an evaporator in which both of said refrigerants evaporate to produce cooling effect, a separating vessel, means for conducting a vapor mixture of said refrigerants into said vessel, means for circulating said solution through the separating vessel to thereby cause the solution to absorb one refrigerant so that the other may condense in said vessel and separate from the solution by gravity and means for returning the refrigerants so separated into the evaporator in liquid form.

15. In refrigerating apparatus, an externally heated vessel, an externally unheated vessel, and means to intermittently circulate liquid between said vessels to transfer heat from the heated vessel to the unheated vessel to vaporize fluid in the unheated vessel.

16. In refrigerating apparatus of the type having an absorber, the improvement which consists of forming a pool of liquid refrigerant in the absorber, and introducing warm absorption liquid into the absorber to vaporize said refrigerant liquid.

17. Absorption refrigerating apparatus of the kind employing a pressure compensating fluid including a generator, a condenser, an evaporator adapted to hold a pool of liquid, and an absorber, and conduits connecting the same to form a main circuit for refrigerant through generator, condenser, evaporator and absorber, a first local circuit for absorption liquid through generator and absorber, and a second local circuit for pressure compensating fluid through evaporator and absorber, said system including means to build up sufficient pressure in said second local circuit to cause the pressure compensating fluid to recirculate therein and to pass through liquid of said pool in the evaporator due to said pressure and to cause circulation of absorption liquid between the generator and the absorber due to said pressure.

18. Absorption refrigerating apparatus of the kind employing a pressure compensating fluid including a generator, a condenser, an evaporator adapted to hold a pool of liquid, and an absorber adapted to hold a pool of liquid, and conduits connecting the same to form a main circuit for refrigerant through generator, condenser, evaporator and absorber, a first local circuit for absorption liquid through generator and absorber, and a second local circuit for pressure compensating fluid through evaporator and absorber, said system including means to build up pressure in said second local circuit to cause pressure compensating fluid to recirculate therein and to pass through liquid of the pool in the evaporator and liquid of the pool in the absorber due to said pressure and to cause circulation of absorption liquid between the generator and the absorber due to said pressure.

19. Absorption refrigerating apparatus of the kind employing a pressure compensating fluid including a generator, a condenser, an evaporator adapted to hold a pool of liquid, and an absorber adapted to hold a pool of liquid, and conduits connecting the same to form a main circuit for refrigerant through generator, condenser, evaporator and absorber, a first local circuit for absorption liquid through generator and absorber, and a second local circuit for pressure compensating fluid through evaporator and absorber, said system including means to build up sufficient pressure in said second local circuit to cause pressure compensating fluid to recirculate therein and to pass through liquid of the pool in the evaporator and liquid of the pool in said absorber due to said pressure, and additional means to cause circulation between said generator and said absorber due to said pressure.

20. Absorption refrigerating apparatus of the kind employing a pressure compensating fluid including a generator, a condenser, an evaporator in which the bulk of refrigerant is evaporated, and an absorber, and conduits connecting the same to form a main circuit for refrigerant through generator, condenser, evaporator and absorber, a first local circuit for absorption liquid through generator and absorber, and a second local circuit for pressure compensating fluid through evaporator and absorber, said system including means to build up pressure in said second local circuit against a liquid head to cause pressure compensating fluid to recirculate therein and means to cause circulation between the generator and absorber due to the pressure built up in said second local circuit, said second circuit constituting the sole means for conducting pressure compensating fluid from the evaporator to the absorber.

21. Absorption refrigerating apparatus of the kind employing a pressure compensating fluid including a generator, a condenser, an evaporator adapted to hold a pool of liquid, and an absorber, and conduits connecting the same to form a main circuit for refrigerant through generator, condenser, evaporator and absorber, a first local circuit for absorption liquid through generator and absorber, and a second local circuit for pressure compensating fluid through evaporator and absorber, said system including means to build up sufficient pressure in fluid passing to the evaporator to cause such fluid to recirculate in said second local circuit and pass through liquid of the pool in the evaporator and to cause circulation of absorption liquid between the generator and the absorber due to said pressure.

22. Absorption refrigerating apparatus of the kind employing a pressure compensating fluid including a generator, a condenser, an evaporator adapted to hold a pool of liquid, and an absorber adapted to hold a pool of liquid, and conduits connecting the same to form a main circuit for refrigerant through generator, condenser, evaporator and absorber, a first local circuit for absorption liquid through generator and absorber, and a second local circuit for pressure compensating fluid through evaporator and absorber, said system including means to build up sufficient pressure in fluid passing to the evaporator to cause such fluid to recirculate in said second local circuit and to pass through liquid of the pool in the evaporator and to pass through liquid of the pool in the absorber and to cause circulation of absorption liquid between the generator and the absorber due to said pressure.

23. Absorption refrigerating apparatus of the kind employing a pressure compensating fluid including a generator, a condenser, an evaporator, and an absorber, and conduits connecting the same to form a main circuit for refrigerant through generator, condenser, evaporator and absorber, a first local circuit for absorption liquid through generator and absorber, and a second local circuit for pressure compensating fluid through evaporator and absorber, said system including means to build up pressure in fluid flowing in said second local circuit against a liquid column head to cause the same to recirculate in said second local circuit and means for producing circulation between the generator and the absorber due to said pressure.

24. A process of refrigerating which includes expelling a refrigerant from absorption liquid, condensing the refrigerant, evaporating the condensed refrigerant in the presence of an auxiliary agent, conducting refrigerant and auxiliary agent into the presence of the absorption liquid, returning the auxiliary agent to the place of evaporation, raising the pressure of fluid flowing to the place of evaporation, causing circulation of fluid between the place of evaporation and the place of absorption due to said pressure while passing auxiliary agent both through liquid in the place of evaporation and the place of absorption, and causing circulation between the place of expulsion and the place of absorption due to said pressure.

25. In an absorption system of the kind employing a pressure compensating fluid including a generator, a condenser, an evaporator adapted to hold a pool of liquid, and an absorber, and conduits connecting the same to form a main circuit for refrigerant through generator, condenser, evaporator and absorber, a first local circuit for an absorption liquid through generator and absorber, and a second local circuit for pressure compensating fluid through evaporator and absorber, that improvement which consists in raising pressure of fluid in its path of flow in said second local circuit, causing pressure compensating fluid to pass upwardly through liquid in the evaporator due to said pressure and causing circulation of absorption liquid in said first local circuit due to said pressure.

26. In an absorption system of the kind employing a pressure compensating fluid including a generator, a condenser, an evaporator, and an absorber, and conduits connecting the same to form a main circuit for refrigerant through generator, condenser, evaporator and absorber, a first local circuit for an absorption liquid through generator and absorber, and a second local circuit for pressure compensating fluid through evaporator and absorber, that improvement which consists in raising pressure of fluid in its path of flow in said second local circuit, causing pressure compensating fluid to flow upwardly through liquid in said evaporator and said absorber due to said pressure and causing circulation of absorption liquid in said first local circuit due to said pressure.

27. In a continuous absorption refrigeration system of the kind employing a pressure equalizing fluid, the combination of a generator, an absorber, an evaporator, conduits for circulating the pressure equalizing fluid between the evaporator and absorber, means for raising the pressure in one of said conduits to a total pressure above the pressure of gas in the evaporator and means for circulating absorption liquid between the generator and absorber and utilizing the raised pressure to promote the liquid circulation.

28. In refrigerating apparatus of the absorption type, a first element for producing a vapor mixture, a second element, means to conduct said vapor mixture to said second element, means to conduct absorption liquid to said second element, said second element constituting a condenser for one of the constituents of said vapor mixture, a separate condenser, a conduit connecting said separate condenser with said second element, and means to re-evaporate the vapor constituent condensed in said second element.

29. The method of producing refrigeration including the steps of vaporizing a plurality of refrigerants in the presence of each other, conducting the vapors to the presence of absorption liquid, absorbing one refrigerant and condensing another in the presence of the absorption liquid, separating the condensed and absorbed refrigerants, expelling absorbed refrigerant from solution and condensing the same, and again conducting the refrigerants into the presence of each other.

30. The method of producing refrigeration including the steps of vaporizing a plurality of refrigerants in the presence of each other, conducting the vapors to the presence of absorption liquid, absorbing one refrigerant and condensing another in the presence of the absorption liquid, separating the condensed and absorbed refrigerants by gravity, expelling absorbed refrigerant from solution and condensing the same, and again conducting the refrigerants into the presence of each other.

31. In absorption refrigerating apparatus, an evaporator containing a plurality of immiscible refrigerants, absorbing means containing liquid adapted to absorb one refrigerant and not another, means to cool said absorbing means to condense unabsorbed refrigerant, whereby the absorbed and condensed refrigerants are separated by gravity, means to remove the condensed and absorbed refrigerants from the presence of each other, and means to return the refrigerants to the evaporator.

32. That improvement in the art of refrigerating through the agency of an absorption system including a generator, an evaporator and an them and containing a plurality of complementary diffusing agencies in the evaporator which consists in creating a liquid column pressure head within the system, producing circulation between the generator and absorber due to said head and maintaining a lower pressure in said generator than in said evaporator due to said head by an amount determined by said head.

33. Absorption refrigerating apparatus comprising a generator, a condenser connected to said generator, an evaporator situated below said condenser, a conduit extending vertically between said condenser and said evaporator for flow of liquid from said condenser into said evaporator having a lower opening within said evaporator at a lower portion thereof and arranged to hold a column of liquid serving to maintain a higher pressure in said evaporator than in said condenser, an absorber connected to said evaporator, and means for circulating absorption liquid between the generator and absorber due to pressure exerted by said liquid column.

34. Absorption refrigerating apparatus comprising a generator, a condenser connected to said generator, an evaporator situated below said condenser, a conduit extending vertically between said condenser and said evaporator for flow of liquid from said condenser into said evaporator having a lower opening within said evaporator at a lower portion thereof and arranged to hold a column of liquid serving to maintain a higher pressure in said evaporator than in said condenser, an absorber, means to circulate an auxiliary agent between and through the evaporator and absorber and means to circulate absorption liquid between and through the generator and absorber due to pressure exerted by said liquid column.

35. In a refrigeration system of the absorption type including a generator and an absorber interconnected for the circulation of absorption solution therebetween, and an evaporator containing a body of liquid refrigerant, introducing an inert volatile fluid into said body of liquid refrigerant below the liquid level of the body, and flowing the resulting gas mixture by bubbling in solution in said absorber to cause circulation of the solution between said absorber and generator and absorption of refrigerant vapor.

36. In an absorption refrigeration system, an absorber comprising a closed vessel divided into upper and lower chambers, a conduit within said vessel open at the lower end in said lower chamber, and at the upper end in said upper chamber, a generator, a connection for liquid from said generator to the lower chamber of said absorber, a return conduit from the upper chamber of said absorber to said generator, an evaporator, and means for circulating gas from said evaporator upwardly through said conduit in the absorber.

37. In a method of refrigeration which includes distillation of refrigerant fluid from solution in an absorption liquid in a heated zone, evaporation and diffusion of the distilled refrigerant fluid due to the presence of a complementary fluid, and absorption of refrigerant fluid out of the complementary fluid into absorption liquid withdrawn from said heated zone, that improvement which consists in causing positive circulation of complementary fluid in bubble form within both refrigerant liquid and weakened absorption liquid, and utilizing the bubbling of gas within the absorption liquid to raise the liquid to a level from which it may flow by gravity to said heated zone.

38. A method of refrigeration which includes maintaining a body of absorption liquid in a heated zone to cause expulsion of refrigerant fluid dissolved therein, liquefying the expelled refrigerant fluid, evaporating and diffusing the liquid refrigerant by presence of a complementary fluid, withdrawing absorption liquid from said heated zone, cooling the withdrawn absorption liquid, bubbling all of the gas formed by evaporation into the cooled absorption liquid to cause absorption of refrigerant fluid out of the gas into the absorption liquid and elevation of the resulting enriched absorption liquid to a level from which it may flow to said heated zone by gravity.

39. The method of refrigeration which comprises, maintaining a body of liquid refrigerant, introducing an inert volatile fluid into said body below the liquid level of the body to cause evaporation and diffusion of refrigerant into the volatile fluid, flowing the resulting gas mixture by bubbling within a quantity of liquid absorbent for the refrigerant in a cooled zone, utilizing the flow of gas to cause circulation of the liquid absorbent between the cooled zone and a heated zone, and distilling refrigerant from absorbent in the heated zone to maintain said body of refrigerant.

40. A method of refrigeration which includes maintaining a body of absorption liquid in a heated zone, conducting absorption liquid from said heated zone to a cooled zone in a manner so that absorption liquid is maintained in said cooled zone in a body having substantially the same surface level as that in said heated zone, maintaining a body of liquid refrigerant by distillation from absorption liquid in said heated zone, introducing a complementary fluid under pressure below the surface level of said body of refrigerant, circulating gaseous fluid from above the body of liquid refrigerant under sufficient pressure to cause it to bubble into absorption liquid from said cooled zone after first flowing in contact with said liquid refrigerant, and utilizing the bubbling gas to raise absorption liquid to a level above that in said zones from which higher level the liquid may flow by gravity to said heated zone.

41. That method of operating an absorption refrigeration system which includes applying heat to rich absorbent medium to liberate a refrigerant for subsequent use in producing refrigeration, removing and elevating the resultant lean absorbent to an elevated absorption zone by means of a stream of dense inert gas, condensing the refrigerant and evaporating the refrigerant in the presence of a dense inert gas.

42. In the method of operating an absorption refrigeration system of the type employing a refrigerant, an absorbent therefor, and a dense fluid inert with respect to the refrigerant comprising, applying heat to rich absorbent to liberate the refrigerant in gaseous form, transforming the gaseous refrigerant to the liquid phase, permitting the liquid refrigerant to evaporate into said dense fluid to produce refrigeration, said method being characterized by the fact that the lean absorbent produced in the heating zone is elevated to an absorption zone above the heating zone by a propelled stream of refrigerant-carrying dense fluid in which absorption zone the refrigerant is absorbed, and the enriched absorbent is returned to the heating zone by gravity and the dense fluid is returned to the evaporation zone.

43. That improvement in the art of refrigeration accomplished by the aid of a refrigerant medium, an absorbent therefor, and a dense pressure equalizing fluid, which consists in generating refrigerant gas from rich absorbent, raising impoverished absorbent to an elevated point by means of a pressure actuated stream of fluid including dense pressure equalizing fluid, enriching said absorbent by bringing the same into intimate absorbing relation with refrigerant medium, and returning at least part of the enriched absorbent to the upper portion of the liquid in a generating zone whereby the relatively cold enriched absorbent acts to condense gaseous portions of the absorbent which may be passing off along with the refrigerant gas being generated.

44. That improvement in the art of refrigeration by the use of a three fluid absorption system which consists in generating a refrigerant gas for subsequent use in producing refrigeration from rich absorbent in a generating zone, conducting impoverished absorbent from the generating zone to an absorption zone thereabove by means of a pressure actuated stream of fluid including a dense inert gas, enriching said absorbent by bringing the same into intimate absorbing relation with refrigerant gas, returning the enriched absorbent to a generating zone by gravity, condensing the refrigerant gas and evaporating the refrigerant in the presence of dense inert gas.

45. A method of refrigeration which includes maintaining a body of absorption liquid in a heated zone, conducting absorption liquid from said heated zone to a cooled zone, maintaining a body of liquid refrigerant by distillation from absorption liquid in said heated zone, producing refrigeration by complementary diffusion of refrigerant from said body and a complementary fluid while introducing the complementary fluid below the surface level of refrigerant liquid, flowing the combined gases resulting from said production of refrigeration in contact with absorption liquid from said cooled zone, and utilizing the combined gases to raise the absorption liquid to a level from which the liquid may flow by gravity to said heated zone.

46. Absorption refrigerating apparatus of the kind employing a pressure compensating fluid including a generator, a condenser, an evaporator, an absorber, and conduits connecting said parts to form a main circuit for refrigerant through generator, condenser, evaporator and absorber, a first local circuit for absorption liquid through generator and absorber and a second local circuit for compensating fluid through absorber and evaporator, said system being operative to maintain a head imposing quantity of liquid in each of said local circuits, and said system including means to build up sufficient pressure in said second local circuit to cause pressure compensating fluid to flow therein and to cause absorption liquid to flow in said first local circuit and to cause compensating fluid to pass through said head imposing liquid.

47. An absorption type refrigeration system including a generator, an absorber, an evaporator adapted to hold a body of liquid refrigerant, a conduit for weakened absorption liquid from said generator to said absorber and arranged so that liquid is contained in said absorber and said generator at substantially the same surface level, means for circulating inert volatile fluid between said evaporator and absorber against a liquid column head while introducing the inert fluid below the surface level of liquid refrigerant in the evaporator and constructed and arranged so that gas formed in the evaporator is under sufficient pressure to cause it to flow upwardly into liquid in said absorber in bubble form, means utilizing the bubbling gas for raising liquid in said absorber to a level above that in said generator and absorber, and means for conducting liquid from said higher level to said generator.

48. That improvement in the art of refrigeration accomplished by the aid of a refrigerant medium, an absorbent therefor, and a dense pressure equalizing fluid, which consists in raising portions of the lean absorbent medium to an elevated point by means of propelled fluid including said pressure equalizing fluid, exposing said lean absorbent medium to refrigerant gas, thereafter separately applying heat to expel refrigerant gas from the absorbent medium, and then separately condensing the expelled refrigerant.

49. That improvement in the art of refrigeration by the use of a three fluid absorption system of the type employing a refrigerant medium, an absorbent therefor, and a pressure equalizing fluid, and having a refrigerant medium circuit, an absorbent circuit, and a pressure equalizing fluid circuit, which improvement consists in creating a pressure difference reacting against hydrostatic pressure, maintaining a pool of liquid refrigerant in the pressure equalizing fluid circuit, maintaining a pool of absorption liquid in the absorbent circuit, and utilizing said pressure difference to circulate liquid refrigerant through at least a part of said refrigerant medium circuit, to introduce pressure equalizing fluid into the pool of liquid refrigerant below the surface level thereof, to introduce gaseous fluid into the pool of absorption liquid below the surface level thereof, and to circulate said absorbent through at least a part of said absorbent circuit.

50. That improvement in the art of refrigeration by the use of a three fluid absorption system of the type employing a refrigerant medium, an absorbent therefor, and a pressure equalizing fluid, and having a refrigerant medium circuit, an absorbent circuit, and a pressure equalizing fluid circuit, which improvement consists in creating a pressure difference reacting against hydrostatic pressure, maintaining a pool of liquid refrigerant in the pressure equalizing fluid circuit, maintaining a pool of absorption liquid in the absorbent circuit, and utilizing said pressure difference to circulate liquid refrigerant through at least a part of said refrigerant medium circuit, to introduce pressure equalizing fluid into the pool of liquid refrigerant below the surface level thereof, to introduce gaseous fluid into the pool of absorption liquid below the surface level thereof, and to circulate said absorbent through at least a part of said absorbent circuit, said pressure difference being applied so as to circulate said refrigerant medium and said absorbent simultaneously.

51. That improvement in the art of refrigeration by the use of a three fluid absorption system of the type employing a refrigerant medium, an absorbent therefor, and a dense pressure equalizing fluid, and having a refrigerant medium circuit, an absorbent circuit, and a pressure equalizing fluid circuit, which improvement consists in creating a pressure difference reacting against hydrostatic pressure, and utilizing said pressure difference to circulate liquid refrigerant through at least a part of said refrigerant medium circuit, and to circulate said absorbent through at least a part of said absorbent circuit, the arrangement being such that said absorbent will flow through the remainder of said absorbent circuit by gravity.

ALVAR LENNING.

CERTIFICATE OF CORRECTION.

Patent No. 2,199,077.　　　　　　　　　　　　　　April 30, 1940.

ALVAR LENNING.

It is hereby certified that error appears in the printed specification of the above numbered patent requiring correction as follows: Page 8, first column, line 32, claim 32, before "them" insert the words --absorber connected to afford circulation between--; and that the said Letters Patent should be read with this correction therein that the same may conform to the record of the case in the Patent Office.

Signed and sealed this 18th day of June, A. D. 1940.

Henry Van Arsdale,
　　　　　　　　　　　　　　　　　　　Acting Commissioner of Patents.